United States Patent
Sudau

[11] Patent Number: 6,126,568
[45] Date of Patent: Oct. 3, 2000

[54] TORSIONAL VIBRATION DAMPER FOR A BRIDGE CLUTCH WITH PLANETARY GEAR SET

[75] Inventor: Jörg Sudau, Niederwerrn, Germany

[73] Assignee: Mannesmann Sachs AG, Schweinfurt, Germany

[21] Appl. No.: 09/139,458

[22] Filed: Aug. 25, 1998

[30] Foreign Application Priority Data

Aug. 25, 1997 [DE] Germany ............................ 197 36 843

[51] Int. Cl.$^7$ .................................................. F16H 57/08
[52] U.S. Cl. ..................... 475/347; 475/346; 192/3.29; 192/30 V; 192/55.61; 192/212
[58] Field of Search .................... 192/3.29, 3.3, 192/30 V, 55.61, 212; 475/331, 346, 347

[56] References Cited

U.S. PATENT DOCUMENTS

| 2,855,802 | 10/1958 | Gorsky | 475/346 |
| 2,995,956 | 8/1961 | Moore | 192/3.3 |
| 4,252,226 | 2/1981 | Staub, Jr. . | |
| 4,291,790 | 9/1981 | Staub, Jr. . | |
| 4,398,436 | 8/1983 | Fisher | 74/688 |
| 5,634,866 | 6/1997 | Sudau | 475/347 |
| 5,716,300 | 2/1998 | Sammataro et al. | 475/346 |
| 5,733,218 | 3/1998 | Sudau et al. | 475/347 |
| 5,816,973 | 10/1998 | Sudau et al. | 475/347 |
| 5,836,217 | 11/1998 | Sudau et al. | 74/574 |
| 5,863,274 | 1/1999 | Jackel | 475/347 |

FOREIGN PATENT DOCUMENTS

| 306 169 | 3/1989 | European Pat. Off. . |
| 533 426 | 3/1993 | European Pat. Off. . |
| 41 21 586 | 1/1993 | Germany . |
| 44 44 196 | 6/1995 | Germany . |
| 195 14 411 | 11/1995 | Germany . |
| 2 220 464 | 10/1990 | United Kingdom . |
| 2 320 534 | 6/1998 | United Kingdom . |

Primary Examiner—Charles A. Marmor
Assistant Examiner—Ha Ho
Attorney, Agent, or Firm—Cohen, Pontani, Lieberman & Pavane

[57] ABSTRACT

A torsional vibration damper at a bridge clutch of a hydrodynamic torque converter is constructed with a drive-side transmission element which can be brought into a working connection with the converter housing and is connected with a driven-side transmission element by a coupling mechanism provided with an energy accumulator acting in the circumferential direction. The driven-side transmission element is fixed with respect to rotation relative to a driven-side structural component part of the torque converter. The transmission elements, together with the coupling device, form a gear unit with gear unit elements via which the secondary diagonal of the mass matrix is occupied for forming a decoupling frequency. The decoupling frequency can be adapted to a predetermined resonant frequency of the drivetrain of a motor vehicle by an appropriate configuration of the mass moments of inertia of the gear unit elements contained in the mass matrix and of the springs of the energy accumulator given in a stiffness matrix.

6 Claims, 4 Drawing Sheets

TORSIONAL VIBRATION DAMPER FOR A BRIDGE CLUTCH WITH PLANETARY GEAR SET

SUMMARY OF THE INVENTION

1. Field of the Invention

The invention relates to a torsional vibration damper for a bridge coupling or bridge clutch of a hydrodynamic torque converter.

2. Discussion of the Prior Art

A torsional vibration damper of the kind mentioned above is known, for example, from German reference DE 41 21 586 Al. According to FIG. 1 of this reference, the torque converter is constructed with a bridge clutch whose piston is provided with a friction facing on the side of the piston facing the converter housing. The piston can be brought into a frictional connection, via the friction facing, with a friction zone of the adjacent converter housing. Cover plates acting as a drive-side transmission element of the torsional vibration damper are fastened to the piston on the side remote of the converter housing. These cover plates have windows for receiving springs which act as an energy accumulator and which are supported at a hub disk that is connected at its radial inner region via a toothing with the turbine hub by means of a driven-side structural component part in the form of a retaining yoke so as to be fixed with respect to rotation relative to the turbine hub which acts, via a toothing, on a driven shaft such that it is fixed with respect to rotation relative to it. The hub disk acts as a driven-side transmission element of the torsional vibration damper, wherein the energy accumulator acts as a coupling device between the hub disk and the drive-side transmission element.

Also shown in this reference, namely in FIG. 3, is a bridge clutch in which the piston directs its rotating movement to the turbine wheel, and accordingly to the turbine hub, via a disk or plate which is provided axially between the piston and the converter housing and which is drivable via friction facings. In bridge clutches of this kind in which a torsional vibration damper is omitted, the piston is relieved in the event of torsional vibrations by a buildup of pressure in a chamber provided axially between the piston and the converter housing such that the piston operates with slip relative to the converter housing and accordingly reduces the amplitude of the torsional vibrations.

Considered as a free oscillating system, the drivetrain of a motor vehicle can be roughly reduced to six masses, wherein it is assumed that the drive including the pump wheel is the first mass, the turbine is the second mass, the transmission input shaft is the third mass, the cardan shaft or universal joint shaft and differential are the fourth mass, the wheels are the fifth mass and the vehicle overall is the sixth mass. In a free oscillating system with n masses, that is, in this case, six, it is known that n–1 resonant frequencies, therefore, five resonant frequencies, occur. However, the first resonant frequency relates to the rotation of the entire oscillating system and is not relevant to vibration damping. The rates of rotation at which the resonant frequencies are excited depend on the number of cylinders of the drive which is constructed as an internal combustion engine.

In the interest of the lowest possible fuel consumption, there is a tendency to close a bridge clutch already at a very low rate of rotation, for example, at 1200 RPM, in order to minimize slip-related losses in the converter circuit. In a four-cylinder engine, 1200 RPM corresponds to 40 Hz, taking into account the second order which is very significant for the formation of resonant frequencies. In the case of bridge clutches, such as those in FIG. 3 of German reference DE 41 21 586 A1, without torsional vibration dampers, this means that the bridge clutch is closed at a frequency which lies above the first and second resonant frequencies, but below the third and fourth resonant frequencies. While the first two resonant frequencies in the converter circuit can be damped and are accordingly not harmful, the drivetrain can be excited such that unwanted noise occurs when passing through the third and fourth resonant frequencies, wherein the third resonant frequency, in particular, has a very large amplitude.

When the bridge clutch is constructed with a torsional vibration damper according to FIG. 1 of German reference DE 41 21 586 A1, the decoupling of the drive side and driven side of the bridge clutch is improved by the energy accumulator so that the amplitudes of the third and fourth resonant frequencies which are perceived as troublesome are reduced so that they cause less unwanted noise when the bridge clutch is closed than in constructions without torsional vibration dampers. On the other hand, the further resonant frequency formed due to the additional mass introduced by the torsional vibration damper is less harmful because this resonant frequency occurs in a very low speed range, preferably below 600 RPM, therefore in a speed range in which the bridge clutch is open and the converter circuit can act so as to damp vibrations.

However, in summary, even when the bridge clutch is constructed with a torsional vibration damper in accordance with the above reference, the problem persists that the third resonant frequency cannot be eliminated.

German reference DE 195 14 411 A1 shows, in FIG. 1, a bridge clutch in which a torsional vibration damper acts with its drive-side transmission element on the turbine hub and with its driven-side transmission element on a driven shaft which acts in a known manner as a transmission input shaft. Such torsional vibration dampers are referred to in technical circles as "turbine dampers" and have the following characteristic: By means of direct connection of the driven-side transmission element of the torsional vibration damper with the transmission input shaft, the energy accumulator which connects this transmission element with the drive-side transmission element acts as if it were in a series connection with the elasticity of the transmission shaft, which elasticity is conditional upon torsion. However, since the stiffness of the energy accumulator is much less than that of the transmission input shaft, the transmission input shaft is considered very soft with respect to total rigidity. The greater softness of the transmission shaft results in improved decoupling.

With respect to the resonant frequencies in the drivetrain, as a consequence of the greater softness of the transmission input shaft the third and fourth resonant frequencies have greater amplitudes in comparison with the above-mentioned bridge clutch with the torsional vibration damper between the piston and turbine hub, but the third resonant frequency occurs at considerably lower rates of rotation, namely at rates of rotation in the order of magnitude of the second resonant frequency. Accordingly, the third resonant frequency has practically no effect when the bridge clutch is closed at 1200 RPM. However, no influence can be exerted on the fourth resonant frequency, so that noises can occur when passing through the speed range associated with this resonant frequency.

SUMMARY OF THE INVENTION

Accordingly, it is an object of the present invention to provide a torsional vibration damper for a bridge clutch of a hydrodynamic torque converter so that as few resonant frequencies as possible, with the smallest possible amplitudes, can form even at a very low closing rate of rotation of the bridge clutch above the frequency range associated with this rate of rotation.

Pursuant to this object, and others which will become apparent hereafter, one aspect of the present invention resides in a torsional vibration damper having a driven-side transmission element, a drive-side transmission element which can be brought into a working connection with the converter housing, and coupling means for connecting the drive-side transmission element with the driven-side transmission element. The coupling means includes a circumferentially acting energy accumulator having springs. The driven-side transmission element is fixed with respect to rotation relative to the driven-side structural component part of the torque converter. The transmission elements, together with the coupling means forming a gear unit having gear unit elements so that a secondary diagonal of a mass matrix is occupied for forming a decoupling frequency. The decoupling frequency is adaptable to a predetermined resonant frequency of a motor vehicle drivetrain for reducing the amplitude of the resonant frequency by means of an appropriate configuration of mass moments of inertia of the gear unit elements contained in the mass matrix and of the springs of the energy accumulator given in a stiffness matrix, and by means of a corresponding multiplication of the gear unit.

The advantage resulting from the construction of the torsional vibration damper according to the invention having a gear unit is illustrated hereinafter with reference to a planetary gear set, wherein, for this embodiment, the drive-side transmission element is selected as a planet carrier at which the planet wheels are received so as to be rotatable. The planet wheels drive a floating-mounted ring gear on one side and a sun gear on the other side, wherein the sun gear forms the driven-side transmission element. Depending on the manner of functioning of the planetary gear set, especially in this case as a result of the gear unit masses additionally introduced through the latter, there is generated a mass matrix M given by the following formula:

$$M = \begin{bmatrix} J_{*t} + \frac{4}{(i+1)^2} \cdot J_p + \frac{(i-1)^2}{i^2} \cdot J_h & -\frac{4}{(i+1)^2} \cdot J_p + \frac{i-1}{i^2} \cdot J_h \\ -\frac{4}{(i+1)^2} \cdot J_p + \frac{i-1}{i^2} \cdot J_h & J_S + \frac{4}{(i+1)^2} \cdot J_p + \frac{i-1}{i^2} \cdot J_h \end{bmatrix},$$

$$\text{where } i = -\frac{r_H}{r_s} \quad J_{*t} = J_t + m_p \cdot a^2$$

The letter symbols contained in the formula indicated above are defined as follows:

$J_t$—mass moment of inertia of planet carrier
$J_s$—mass moment of inertia of sun gear
$J_h$—mass moment of inertia of ring gear
$J_p$—mass moment of inertia of planet wheel
$m_p$—mass of planet wheel
a—axial distance (axis of rotation to center axis of planet wheel)

The parts of the formula between the brackets at upper left and lower right form the main diagonal of the mass matrix, while the parts at lower left and upper right form the secondary diagonal of the mass matrix. The main diagonal indicates the resonant frequency of the torsional vibration damper by the mass moments of inertia and gear multiplications indicated therein. Of course, the stiffness given by the energy accumulator is also indicated, wherein the stiffness matrix is as follows:

$$c = c' \begin{bmatrix} 1 & -1 \\ -1 & 1 \end{bmatrix},$$

where c' is the spring constant of the energy accumulator.

The secondary diagonal of the mass matrix gives the "negative resonant frequency" of the torsional vibration damper, the optimum decoupling frequency, a frequency at which a minimum is achieved in the amplitude-frequency response. Also, the secondary diagonal is dependent on mass moments of inertia of the planetary gear set, on the multiplication between the drive-side transmission element and the driven-side transmission element, and on the stiffness of the energy accumulator.

Thus, in contrast to gearless torsional vibration dampers in which the secondary diagonal is zero, the secondary diagonal in the torsional vibration damper according to the invention is occupied and manifests itself in the formation of the above-mentioned decoupling frequency. Since it is not only the mass matrix but also the stiffness matrix given by the energy accumulator that is of decisive importance in a torsional vibration damper with a gear unit, suitable adaptation of the mass moments of inertia to the elements of the planetary gear set and of the energy accumulator makes it possible to configure the decoupling frequency so that it falls within the frequency range of the most troublesome resonant frequency, that is, the third resonant frequency of the drivetrain described above. Ideally, this leads to the elimination of this resonant frequency, but at least results in a substantial reduction in its amplitude.

As a result, only one resonant frequency remains above the closing range of rotation of the bridge clutch, namely the fourth resonant frequency, which, because of the effect of the torsional vibration damper between the converter housing and turbine wheel, is reduced in amplitude to a degree at which no further noise can occur when traversing this resonant frequency.

Also as a result of the additional masses introduced by the gear unit, the natural frequency of the torsional vibration damper according to the invention is in a speed range of the drive lying considerably below the closing rate of rotation of the bridge coupling. Since the torsional vibration damper is accordingly always inactive when passing through its critical speed range, the springs of its energy accumulator can be adapted so that an excellent decoupling behavior is ensured. Further, a positive secondary effect of the gear unit consists in the greater dynamic mass moment of inertia of the pump and turbine when the bridge clutch is closed due to the effect of the mass moments of inertia of the gear unit elements, e.g., the planet wheel and ring gear, which are multiplied by way of the gears and given during acceleration. Accordingly, there occurs at the torsional vibration damper an apparently higher mass moment of inertia which hinders the development of torsional vibrations by reacting on the crankshaft of the drive. This results in lower torque fluctuations at the engine front. This has the advantageous result that auxiliary or added units driven by the crankshaft are protected in particular.

On the other hand, when the bridge clutch is inactive, the torsional vibration damper acts as a damping mechanism, wherein as a result of the torque multiplication stipulated by the gear unit and due to the additional mass introduced by the gear unit elements, the damper function has an appreciably stronger effect than in a gearless torsional vibration damper. The known function of a damping mechanism, namely the reduction of determined amplitudes by a certain amount, can be utilized in an outstanding manner in this way, so that a troublesome resonant frequency can be influenced advantageously also when the bridge clutch is open, given a suitable configuration.

When the gear unit is constructed as a planetary gear set in which at least one element is in a working connection with at least one of the transmission elements by way of an energy accumulator, the following takes place: When a torsional vibration is introduced, the torque associated therewith can be divided by the planetary gear set, wherein a first partial torque is transmitted to the driven-side transmission element, but a second partial torque is transmitted to an intermediate mass formed by at least one of the elements of the planetary gear set, wherein, with respect to magnitude and working direction, this partial torque depends on the construction of the planetary gear set, on the connection between the latter and the transmission element, and on the arrangement of the spring set. It is quite possible for each of these partial torques to be greater than the introduced torque, but the two partial torques act in opposition to one another because of the arrangement, according to the invention, of the energy accumulator between two respective masses (transmission element or intermediate mass) due to the deformation of the energy accumulator with different deflection angles. While the delivered torque is still in the order of magnitude of the introduced torque in terms of amount, it can be transmitted to the subsequent transmission input shaft with a noticeably smoothed torque curve due to the decoupling function of the energy accumulator.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
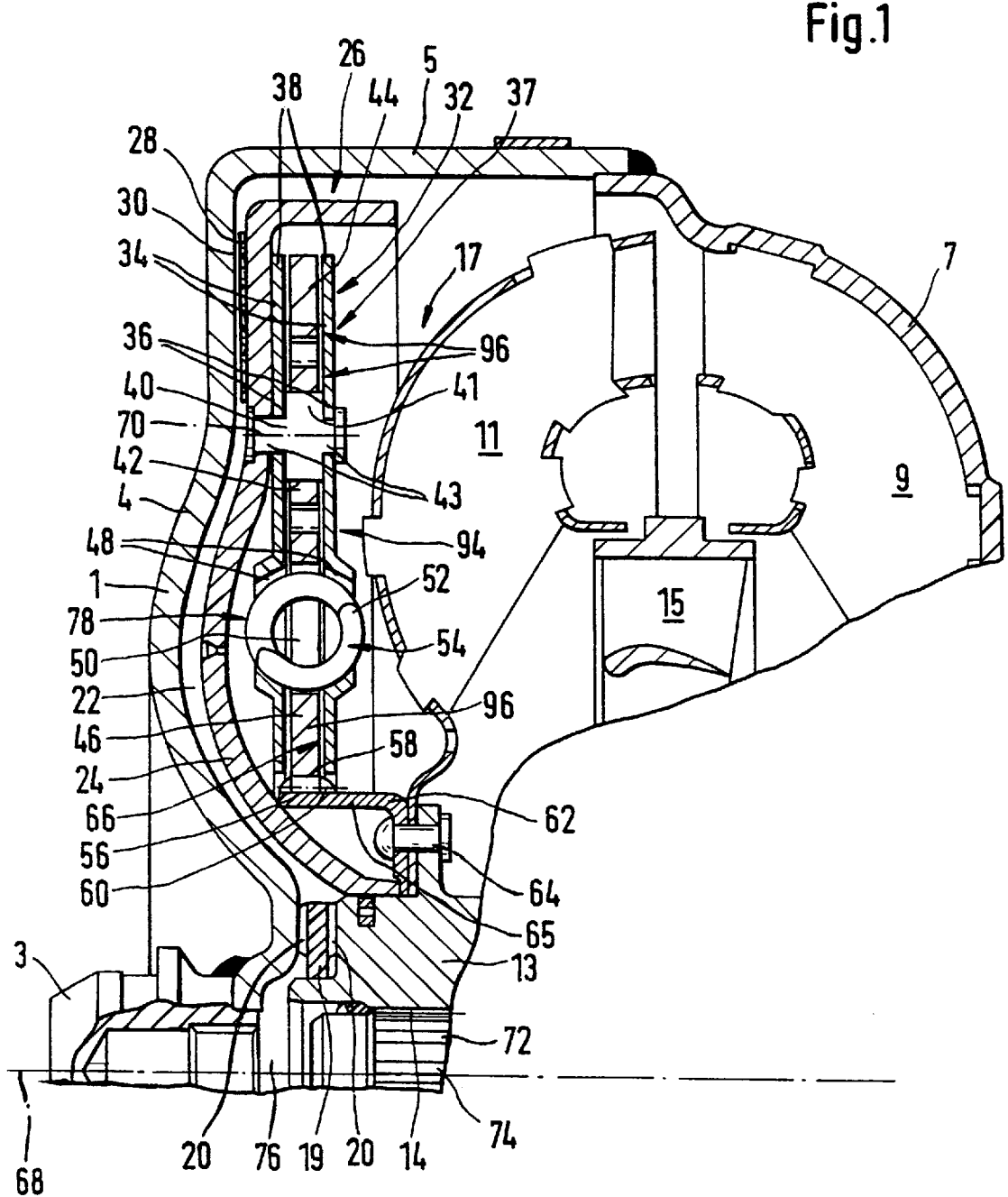
FIG. 1 is a longitudinal section through a top half of a bridge clutch with a torsional vibration damper at a torque converter, pursuant to the present invention.

FIG. 1 shows in detail that region of a hydrodynamic torque converter in which a bridge clutch is provided for transmitting a torque from the converter housing to driven means. An illustration and description of the torque converter in its entirety has been omitted because torque converters of this kind are known from the prior art, for example, from German reference DE 41 21 586 A1. Therefore, the following description is essentially directed to the construction, according to the invention, of the bridge clutch.

The hydrodynamic torque converter shown in FIG. 1 is provided with a converter housing 1 which is connectable with a drive 80 (FIG. 4) such as an internal combustion engine and, in the radial inner region, has a bearing journal 3 from which a radial flange 4 extends outward. The radial flange 4 in the circumferential region passes into an axial portion 5 which serves in turn to receive, in a fixed manner, a pump shell 7 provided for forming the pump wheel 9. This pump wheel 9 cooperates with a turbine wheel 11 and, together with the turbine wheel 11 and a guide wheel 15, forms the hydrodynamic converter circuit 17. The turbine wheel 11 is connected in the radial inner region with a turbine hub 13 by rivets 64. The turbine hub 13 is arranged so as to be rotatable about an axis of rotation 68 and has a toothing 14 for producing a connection with a driven shaft 72 such that the turbine hub 13 is fixed with respect to rotation relative to the driven shaft 72. The driven shaft 72 also serves as a transmission input shaft 82 (FIG. 4) and has a center bore 74 for hydraulic fluid. This center bore 74 can be supplied with hydraulic fluid in a manner known from German reference DE 41 21 586 A1. This hydraulic fluid flows into a space 76 axially adjoining the drive-side end of the driven shaft 72 and then flows through grooves 20 into an axial bearing 19 arranged axially between the converter housing 1 and the turbine hub 13. The fluid proceeds radially outward into a chamber 22 which is situated axially between the radial flange 4 of the converter housing 1 and a piston 24 of a bridge clutch 26, so that the piston 24 is distanced from the radial flange 4 in a known manner against the pressure existing at the converter circuit 17 and a friction facing 28 fastened to the side of the piston 24 facing the radial flange 4 is lifted from the associated friction zone 30 at the radial flange 4. Conversely, the piston 24 is pressed in the direction of the radial flange 4 when the pressure is relieved in the center bore 74 of the driven shaft 72 as a result of the overpressure now present in the converter circuit 17, and the hydraulic fluid contained in the chamber 22 is accordingly pressed through the grooves 20 of the axial bearing 19 radially inward into the space 76 and, from there, into the center bore 74. The bridge clutch 26 is switched in this way.

The bridge clutch 26 is constructed with a torsional vibration damper 32 which is fastened to the side of the piston 24 remote of the friction facing 28, specifically by means of bearing journals 40 which are distributed at equal angular intervals from one another along the circumference. Each bearing journal 40 has a pin 43 on both sides of a center portion 41 which has a larger diameter. The pin 43 facing the piston 24 penetrates a recess in the piston 24 and is fastened by riveting. In addition, the pins 43 penetrate openings in the cover plates 34 which contact on both sides of the center portion 41 of each bearing journal 40 and act as a drive-side transmission element 38 of the torsional vibration damper 32. In conjunction with the bearing journal 40, the cover plates 34 serve as planet carriers 36 for planet wheels 42 of a planetary gear set 37. Each of the planet wheels 42 is mounted so as to be rotatable about a planet wheel center axis 70. Each of these planet wheels 42 is arranged on the center portion 41 of the respective bearing journal 40. The planet wheels 42 engage, via their teeth, with the teeth of a ring gear 44 which surrounds the planet wheels 42 radially and is arranged in a floating manner. The planet wheels 42 additionally mesh by their teeth with a sun gear 46 which is arranged radially inside the planet wheels 42 and which acts as a driven-side transmission element 66 of the torsional vibration damper 32. The sun gear 46 has windows 50 distributed along the circumference for receiving springs 52 of an energy accumulator 54. These windows 50 are aligned with corresponding windows 48 in the cover plates 34. The radial inner side 56 of the sun gear 46 is formed with a toothing 58 which is in a rotating connection with a complementary toothing 60 of a retaining yoke 62 which is fastened, via the above-mentioned rivets 64, to the turbine hub 13 and serves as a driven-side structural component part 65. Like the planetary gear set 37, the energy accumulator 54 mentioned above is also part of a coupling device 78 between the drive-side transmission element 38 and the driven-side transmission element 66 of the torsional vibration damper 32. In the present planetary gear set 37, the planet wheels 42, like the sun gear 46, form an intermediate mass 96 which is connected via the energy accumulator 54 with one of the transmission elements 38, 66, in this case with the transmission element 38. The transmission elements 38, 66, the coupling device 78 and the planet carrier 36, the planet wheels 42, the ring gear 44 and the sun gear 46 make up a gear unit 94.

As long as overpressure is produced in the chamber 22 relative to the converter circuit 17, the piston 24 is distanced far enough from the radial flange 4 of the converter housing 1 so that the friction facing 28 at the piston 24 is separated from the friction zone 30 at the radial flange 4. Movements of the converter housing 1 are then conducted to the turbine wheel 11 via the pump wheel 9 and then, via the turbine hub 13, to the driven shaft 72. When torsional vibrations are superposed on the introduced torque and these torsional vibrations arrive at the turbine wheel 11, the vibratory movements mentioned above are carried out around the axis of rotation 68 in the circumferential direction and, in this case, also carry along the piston 24 via the torsional vibration damper 32. The torsional vibration damper 32 then acts as a damping mechanism, wherein, because of the movement conducted to the sun gear 46 via the complementary toothing 60 and toothing 58, this damping effect additionally initiates a movement, although a relatively small one, at the planet wheels 42 and accordingly at the ring gear 44, so that the damping function is increased relative to a torsional vibration damper without a planetary gear set due to the mass elements of the planetary gear set 37 which are accelerated by this movement.

When overpressure is produced in the converter circuit 17 relative to the chamber 22, the piston 24 is displaced in the direction of the radial flange 4 of the converter housing 1 and the friction facing 28 is accordingly brought into contact with the friction zone 30. Movements of the converter housing 1 are then conducted directly to the piston 24 by circumventing the converter circuit 17 and travel from the piston 24 to the planet wheels 42 via the cover plates 34 which are guided in the same movement with the piston 24, wherein the planet wheels 42 accordingly follow the rotating movement of the cover plates 34 about the axis of rotation 68 on the one hand and are displaced in a rotational movement about their center axes 70 on the other hand. Since the sun gear 46 initially still acts in a stationary manner, this rotational movement of the planet wheels 42 leads to a deflection of the ring gear 44 which is mounted in a floating manner. Depending on the suddenness of the torsional vibration, the acceleration of the planet wheels 42 and the ring gear 44, and accordingly the dynamic mass moment of inertia at the torsional vibration damper 32, is particularly high. Because of the reaction of the torsional vibration damper 32 on the drive 80 (FIG. 4), the building up of torsional vibrations can be hindered at the latter so that the drive 80 also runs more quietly at the engine front.

As soon as the cover plates 34 carry out a relative movement with respect to the sun gear 46, the springs 52 of the energy accumulator 54 are deformed, so that, as a result of the decoupling of the drive-side transmission element 38 from the driven-side transmission element 66 which is achieved in this way, the introduced torsional vibrations are present at the latter so as to be filtered. The torque which is "smoothed" in this way is transmitted via the retaining yoke 62 to the turbine hub 13 and, from the latter, to the driven shaft 72.

Figure 2:
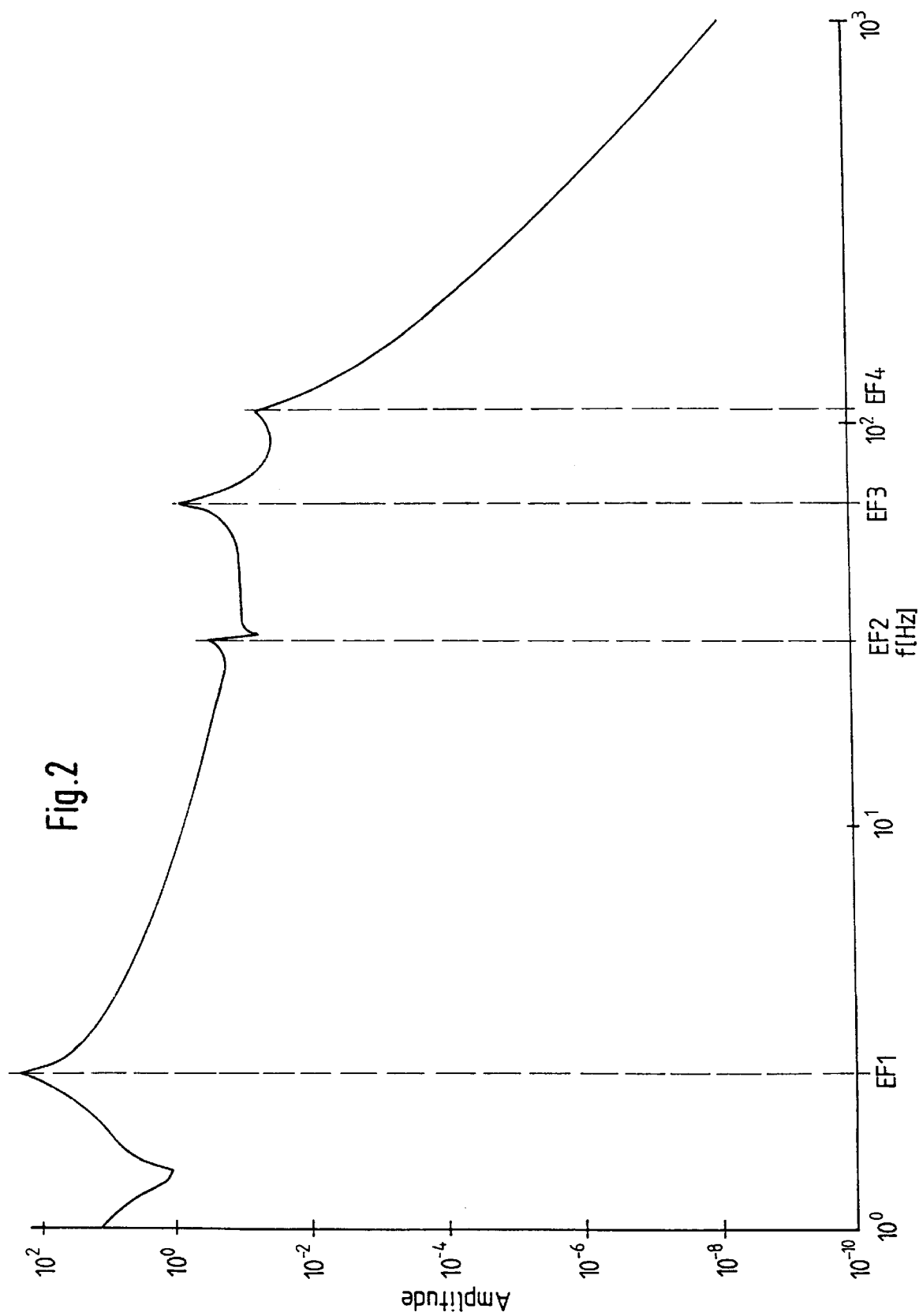
FIG. 2 shows a diagram of the amplitude-frequency response at the turbine of the torque converter in a bridge clutch constructed without a torsional vibration damper, in logarithmic presentation.

The manner of operation resulting from the construction of the torsional vibration damper 32 with the planetary gear set 37 is described in detail with reference to FIGS. 2 to 4.

Figure 4:
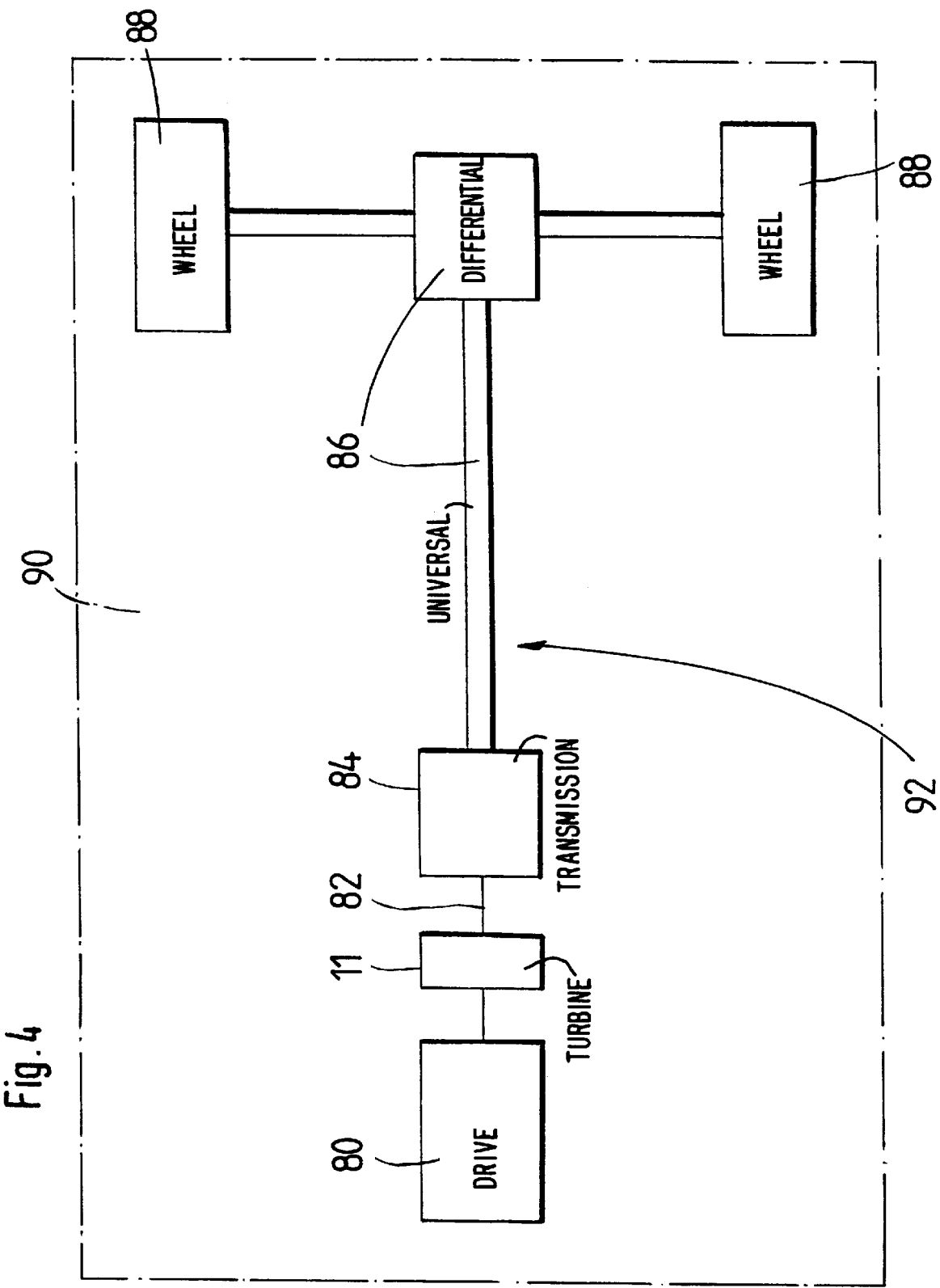
FIG. 4 is a block diagram of a drivetrain of a motor vehicle.

FIG. 4 shows a drivetrain 92 of a motor vehicle 90, wherein the drivetrain 92 is reduced to the six essential oscillatory components. The first essential component is the drive 80 in connection with the pump wheel of the torque converter to which the turbine wheel 11 is connected as the second component. The transmission shaft 82 of an automatic transmission 84 forms the third component, while a universal joint in combination with the differential, both designated by 86, form the fourth component of the drivetrain 92. The wheels 88 serve as the fifth component, and the motor vehicle 90 in its entirety acts as the sixth component. Based on a drivetrain 92 of this kind, an amplitude-frequency response, e.g., for the turbine, results in the manner presented in FIG. 2 when a bridge clutch without torsional vibration damper is used, so that torsional vibrations delivered from the drive 80 are conducted without filtering to the driven shaft 72 and accordingly to the transmission input shaft 82. FIG. 2 shows the amplitude of the oscillatory system, the drivetrain 92 being considered as such, over the frequency response. This is shown logarithmically with respect to amplitude as well as frequency. As was already explained above, in a drivetrain 92 which is reduced to the masses consisting of drive and pump, turbine, transmission input, universal and differential, wheels, and vehicle, there are five resonant frequencies EF, of which the four essential resonant frequencies are designated by EF1 to EF4 in FIG. 2. The fifth resonant frequency is not shown and is also not significant as regards the present invention.

With respect to its amplitude, the strongest resonant frequency EF1 shown in the graph is below 10 Hz at very low frequencies. The second resonant frequency EF2 occurs with respect to order of magnitude at roughly 30 Hz at considerably higher frequency but with a considerably reduced amplitude. EF3 and EF4 follow at still higher frequencies above 50 Hz, wherein EF3 has a considerably greater amplitude than EF4, so that a noise caused by EF3 is substantially less perceptible than a noise generated by EF4.

In the interest of reduced energy consumption, the bridge clutch in modern hydrodynamic torque converters should be controlled even at a very low closing frequency $f_s$ to bring the piston 24 into the axial position in which the friction facing 28 comes into contact with the friction zone 30 of the converter housing 1 and torques are conducted directly to the driven shaft 72 by circumventing the converter circuit 17. Thus, it is endeavored to close the bridge clutch already at 1200 RPM which, based on the especially critical second order in internal combustion engines with four cylinders, means a frequency of 40 Hz. Consequently, EF1 and EF2 lie below this closing frequency $f_s$, so that the large amplitudes occurring at these frequencies can be filtered out in the converter circuit 17 and do not lead to troublesome noises in the drivetrain 92. In contrast, EF3 and EF4 lie above the closing frequency $f_s$ and, because of their comparatively large amplitudes, especially as concerns EF3, result in troublesome noises.

Figure 3:
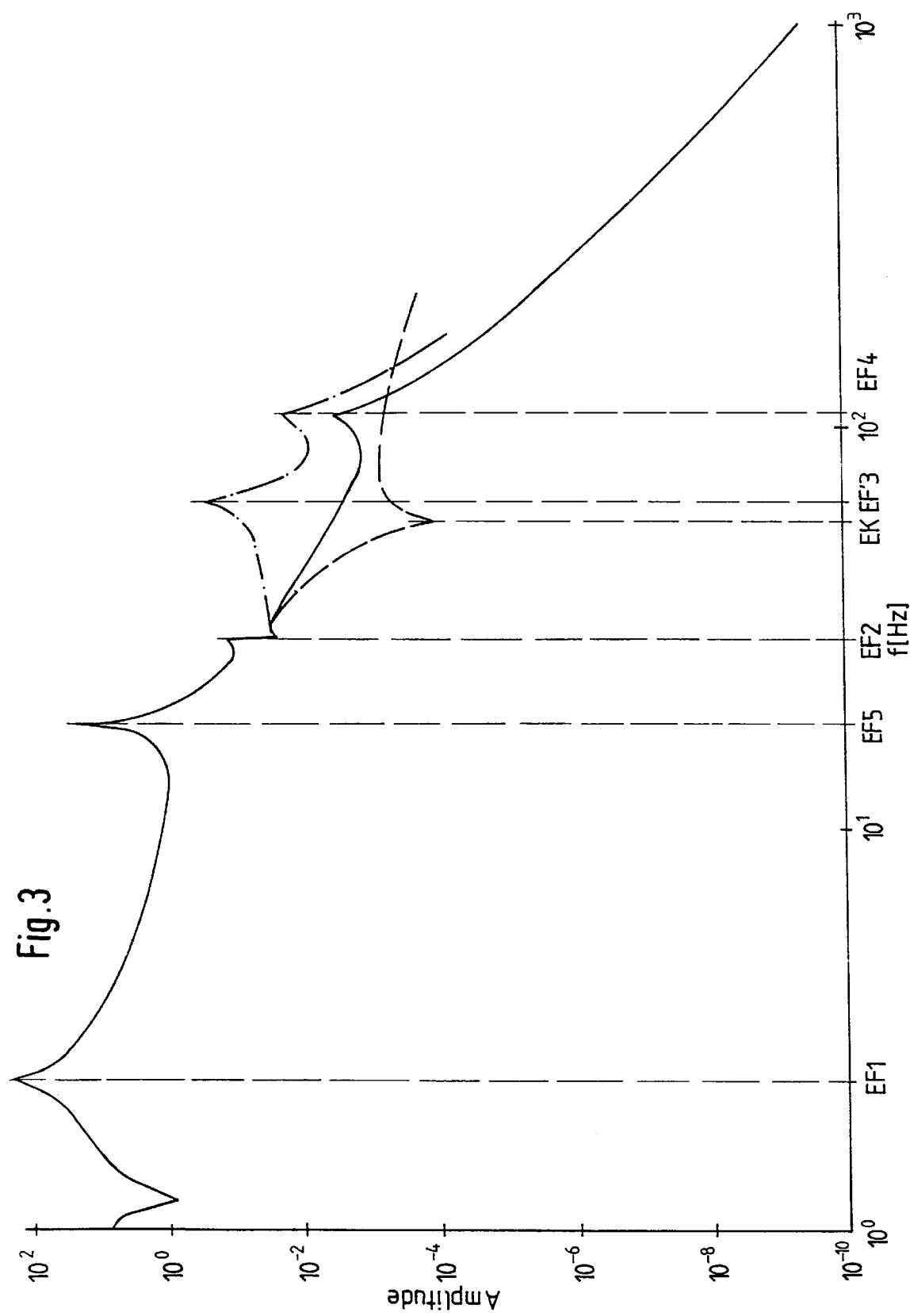
FIG. 3 corresponds to FIG. 2, but with the use of the torsional vibration damper according to the invention at a bridge clutch, likewise in logarithmic presentation.

With respect to this problem, reference is had to the amplitude-frequency response as shown in FIG. 3 which can be achieved by the torsional vibration damper 32 according to the invention. Due to the use of an additional mass system in the form of elements of the planetary gear set 37, an additional resonant frequency occurs which is designated by EF5 in FIG. 3, but this additional resonant frequency lies below the closing frequency $f_s$ of the bridge clutch 23 and is therefore, like EF1 and EF2, not critical with respect to the occurrence of vibration-induced noises. However, as was thoroughly described in the introductory part of the specification, the values occupying the secondary diagonal of the mass matrix as a result of the planetary gear set 37 make possible an amplitude-frequency response indicated by dashed lines in FIG. 3 in the frequency range of EF3 and EF4 and having a determined decoupling frequency EK at which a minimum amplitude occurs. By suitably adapting the masses of the planetary gear set 37 and those of the energy accumulator 54 which participate in the gear multiplication, this decoupling frequency EK is brought as close as possible to the resonant frequency EF3 of the amplitude-frequency response shown in dash-dot lines in FIG. 3 in the frequency range of EF3 and EF4 and ideally coincides with EF3. The superposition of the dash-dot line with amplitude EF3 and that of the dashed line with the decoupling frequency EK gives the solid middle line at which no amplitude EF3 is present. Accordingly, no noise problems occur at this point when the bridge clutch 26 is closed.

Because of the decoupling characteristics achieved by means of a torsional vibration damper of a bridge clutch and brought about as a result of the effect of the energy accumulator 54 between the drive-side transmission element 38 and the drive-side total mass which acts with the same and results from the drive 80 and the converter housing 1, and the driven-side transmission element 66 as well as its total mass which is given, for example, by the subsequent automatic transmission 84, a reduction in the resonant frequency EF4, specifically relative to the dash-dot line shown in FIG. 3 which represents the curve without the torsional vibration damper, is achieved to the extent illustrated by the solid line. It can be seen that with respect to the order of magnitude relating to amplitude, EF4 accordingly lies at a level corresponding to that at point EF3 on the solid line. Accordingly, there is no risk of noise generation even with respect to resonant frequency EF4.

The above-mentioned advantages resulting from the values occupying the secondary diagonal of the mass matrix by means of the formation of a decoupling frequency EK, are described in the preceding by way of example of a possible constructional variant of a planetary gear set 34. However, the secondary diagonals of the mass matrix would likewise be occupied and the corresponding advantages achieved if other switching variants were selected for the planetary gear set 37, for example, if the sun gear acted as a drive-side transmission element and the planet carriers acted as driven-side transmission element. All other gear units 94 in which the secondary diagonal of the mass matrix is occupied are also conceivable for the purpose of achieving this advantage.

The invention is not limited by the embodiments described above which are presented as examples only but can be modified in various ways within the scope of protection defined by the appended patent claims.

I claim:

1. A combination comprising: a hydrodynamic torque converter having a housing, a driven-side structural component part and a lock-up clutch having a piston; and a torsional vibration damper for the lock-up clutch, the torsional vibration damper comprising:

a driven-side transmission element constructed as a sun gear;

a drive-side transmission element constructed as a planet carrier which can be brought into a working connection with the converter housing; and coupling means for connecting the drive-side transmission element with the driven-side transmission element, the coupling means including a circumferentially acting energy accumulator having springs, the driven-side transmission element being fixed with respect to rotation relative to the driven-side structural component part of the torque converter, the transmission elements, together with the coupling means forming a planetary gear set having elements, in addition to the transmission elements and the coupling means, that include a planet wheel that is received on the planet carrier and engages with at least one other element of the planetary gear set, the planet carrier being fixed to the piston of the lock-up clutch, the at least one other element of the planetary gear set being connected by the energy accumulator with at least one of the transmission elements so as to act relative to the at least one transmission element as an intermediate mass which is drivable for a movement depending on a rate of rotation and rotational direction of the transmission elements relative to one another, the sun gear engaging with the planet wheel and being connected with the drive-side transmission element via the energy accumulator, the sun gear having a radial inner side provided with a toothing that engages with a complementary toothing at the driven-side structural component part so as to be fixed with respect to rotation relative to the driven-side structural component part, the gear set elements defining a mass matrix with a secondary diagonal that forms a decoupling frequency, the planetary gear set having a gear multiplication and the gear set elements in the mass matrix and the springs of the energy accumulator, given in a stiffness matrix, being configured to have mass moments of inertia so that the decoupling frequency is adapted to a predetermined resonant frequency of a motor vehicle drivetrain for reducing the amplitude of the resonant frequency.

2. A torsional vibration damper according to claim 1, wherein the at least one other element of the planetary gear set is a sun gear.

3. A torsional vibration damper according to claim 1, wherein the at least one other element of the planetary gear set is a ring gear.

4. A torsional vibration damper according to claim 1, wherein the piston has a friction facing and the converter housing has a friction zone, the lock-up clutch being configured to bring the piston into an axial position in which the friction facing of the piston contacts the friction zone of the converter housing at a point above a resonant frequency for the transmission elements and the gear set.

5. A torsional vibration damper according to claim 2, wherein the springs of the energy accumulator are constructed with a stiffness in order to achieve a decoupling frequency regardless of possible amplitudes at the resonant frequency.

6. A torsional vibration damper according to claim 4, wherein the planet wheel is rotatably supported at the planet carrier, the planetary gear set including a ring gear mounted in a floating manner on the planet wheel.

* * * * *